(12) United States Patent
Ohm et al.

(10) Patent No.: US 11,976,177 B2
(45) Date of Patent: May 7, 2024

(54) POLYMER COMPOSITION AND MEMBRANES MADE THEREFROM WITH IMPROVED MECHANICAL STRENGTH

(71) Applicant: Celanese International Corporation, Irving, TX (US)

(72) Inventors: Christian Ohm, Gernsheim (DE); Fangfang Tao, Shanghai (CN); Man Cheng Li, Shanghai (CN)

(73) Assignee: CELANESE INTERNATIONAL CORPORATION, Irving, TX (US)

(*) Notice: Subject to any disclaimer, the term of this patent is extended or adjusted under 35 U.S.C. 154(b) by 190 days.

(21) Appl. No.: 17/363,844

(22) Filed: Jun. 30, 2021

(65) Prior Publication Data

US 2022/0002520 A1    Jan. 6, 2022

Related U.S. Application Data

(60) Provisional application No. 63/107,088, filed on Oct. 29, 2020, provisional application No. 63/046,879, filed on Jul. 1, 2020.

(51) Int. Cl.
| | |
|---|---|
| *C08K 5/521* | (2006.01) |
| *C08F 110/02* | (2006.01) |
| *C08J 3/11* | (2006.01) |
| *C08J 5/18* | (2006.01) |
| *C08J 9/00* | (2006.01) |
| *C08J 9/28* | (2006.01) |
| *C08K 3/22* | (2006.01) |
| *C08K 5/098* | (2006.01) |

(52) U.S. Cl.
CPC ............ *C08K 5/521* (2013.01); *C08F 110/02* (2013.01); *C08J 3/11* (2013.01); *C08J 5/18* (2013.01); *C08J 9/0023* (2013.01); *C08J 9/0038* (2013.01); *C08J 9/0066* (2013.01); *C08J 9/283* (2013.01); *C08K 3/22* (2013.01); *C08K 5/098* (2013.01); *C08J 2201/03* (2013.01); *C08J 2201/0522* (2013.01); *C08J 2323/06* (2013.01); *C08K 2003/2241* (2013.01); *C08K 2201/019* (2013.01)

(58) Field of Classification Search
CPC .......... C08K 5/521; C08K 3/22; C08K 5/098; C08K 2003/2241; C08K 2201/019; C08K 3/013; C08F 110/02; C08J 3/11; C08J 5/18; C08J 9/0023; C08J 9/0038; C08J 9/0066; C08J 9/283; C08J 2201/03; C08J 2201/0522; C08J 2323/06; C08J 5/2231; Y02E 60/10; C08L 23/06

See application file for complete search history.

(56) References Cited

U.S. PATENT DOCUMENTS

| | | | |
|---|---|---|---|
| 8,802,270 B2 | 8/2014 | Schmitz et al. | |
| 9,620,766 B2 | 4/2017 | Sugata et al. | |
| 2010/0240818 A1 | 9/2010 | Walton et al. | |
| 2015/0315355 A1* | 11/2015 | Seven | C08K 5/12 428/36.9 |
| 2017/0341035 A1 | 11/2017 | Sato et al. | |
| 2017/0373291 A1 | 12/2017 | Kaneda et al. | |
| 2018/0043656 A1 | 2/2018 | Song et al. | |
| 2018/0230293 A1* | 8/2018 | Fukushima | C08K 5/098 |
| 2019/0055385 A1* | 2/2019 | Ohm | C08J 3/075 |
| 2020/0020908 A1 | 1/2020 | Nishimura et al. | |
| 2020/0058915 A1 | 2/2020 | Schmitz et al. | |
| 2021/0047498 A1 | 2/2021 | Fukuda et al. | |

FOREIGN PATENT DOCUMENTS

| | | |
|---|---|---|
| CN | 102148346 A | 8/2011 |
| CN | 108864521 A | 11/2018 |
| CN | 109935759 A | 6/2019 |
| CN | 110197884 A | 9/2019 |
| JP | 2005068249 A | 3/2005 |
| KR | 100814984 B1 | 3/2008 |
| WO | WO 2008/134503 A1 | 11/2008 |
| WO | WO 2009/028737 A1 | 3/2009 |
| WO | WO 2015/077635 A2 | 5/2015 |
| WO | WO2016104791 A1 | 6/2016 |
| WO | WO 2018/005817 A1 | 1/2018 |
| WO | WO2018164055 A1 | 9/2018 |
| WO | WO2018172983 A1 | 9/2018 |
| WO | WO2019065073 A1 | 4/2019 |
| WO | WO2019132694 A1 | 7/2019 |

OTHER PUBLICATIONS

International Search Report and The Written Opinion of the International Searching Authority, or the Declaration Corresponding to Application No. PCT/US21/39793 dated Oct. 13, 2021.

* cited by examiner

*Primary Examiner* — K. Boyle
(74) *Attorney, Agent, or Firm* — Dority & Manning, P.A.

(57) ABSTRACT

A polymer composition for producing gel extruded articles is described. The polymer composition contains polyethylene particles combined with a plasticizer and one or more strength enhancing additives. Polymer articles made in accordance with the present disclosure have enhanced strength properties. In one embodiment, the polymer composition is used to form a porous membrane for use as a separator in electronic devices.

20 Claims, 1 Drawing Sheet

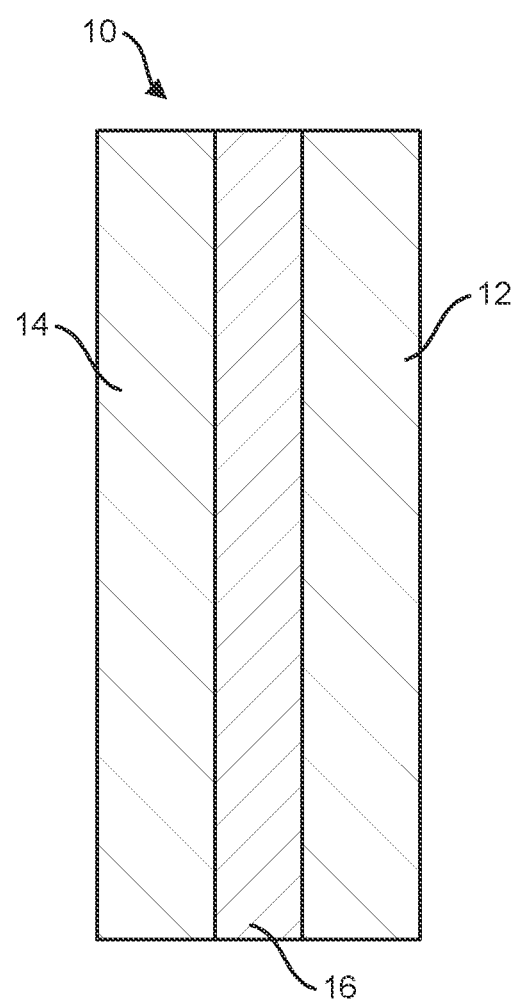

POLYMER COMPOSITION AND MEMBRANES MADE THEREFROM WITH IMPROVED MECHANICAL STRENGTH

RELATED APPLICATIONS

The present application is based upon and claims priority to U.S. Provisional Patent Application Ser. No. 63/046,879, having a filing date of Jul. 1, 2020, and U.S. Provisional Patent Application Ser. No. 63/107,088, having a filing date of Oct. 29, 2020, both of which are incorporated herein by reference.

BACKGROUND

Polyethylene polymers have numerous and diverse uses and applications. For example, high density polyethylenes are valuable engineering plastics, with a unique combination of abrasion resistance, surface lubricity, chemical resistance and impact strength. They find application in the production of high strength fibers for use in ropes and anti-ballistic shaped articles and in the production of other elongated articles, such as membranes for electronic devices. However, since the flowability of these materials in the molten state decreases as the molecular weight increases, processing by conventional techniques, such as melt extrusion, is not always possible.

One alternative method for producing fibers and other elongated components from polyethylene polymers is by gel-processing in which the polymer is combined with a solvent. The resultant gel is extruded into a fiber or membrane and may be stretched in one or two directions. Also, part or all of the solvent may be removed from the product.

Membranes made from polyethylene polymers through gel-processing can be formed to have many beneficial properties. For instance, the membranes can be formed with micro-pores. Microporous polyethylene membranes formed through gel-processing, for instance, are particularly well suited for use as a separator in a battery, such as a lithium ion battery. The microporous membrane, for instance, can separate an anode from a cathode and prevent a short circuit between the active battery components. At the same time, the microporous membrane permits ions to pass through due to the porous nature of the material. The ion permeability characteristics of the microporous polyethylene membrane makes the material particularly well suited for regulating electrochemical reactions within the battery.

In addition to the microporous nature of the polyethylene membrane and to possessing chemical resistance and other physical properties, the polyethylene membranes also offer what is referred to in the art as having an effective "shutdown effect". The shutdown effect refers to the self-closing of micro-pores within the polyethylene separator when it surpasses a certain temperature. When the pores in the polyethylene membrane are closed upon reaching a certain temperature, ions can no longer pass through the membrane and the electrochemical function of the battery stops. This effect becomes an important safety feature for the battery as it prevents thermal runaway reactions from continuing and prevents the battery from overheating and creating a potentially hazardous situation.

In addition to chemical resistance and shutdown properties, polymer membranes should also have very good mechanical properties. For instance, microporous membranes, especially when used as a separator in battery applications, should have relatively high puncture strength, tensile strength, and tensile modulus. In this regard, there is a constant need to improve the above membrane properties. The present disclosure is directed to improving at least one of the above properties through using particular polymer formulations.

SUMMARY

In general, the present disclosure is directed to polyolefin compositions well suited for gel-processing applications. More particularly, the present disclosure is directed to a polymer composition containing a high density polyethylene polymer well suited for producing microporous, ion permeable membranes that may be used as separators in batteries. In accordance with the present disclosure, the polymer composition is formulated so as to have improved mechanical or physical properties. More particularly, the present disclosure is directed to formulating polyethylene polymer compositions that have improved tensile strength and/or puncture resistance when gel extruded into microporous membranes.

In one embodiment, the present disclosure is directed to a polymer composition for producing gel extruded articles. The polymer composition comprises a plasticizer, high density polyethylene particles and at least one strength enhancing agent. The strength enhancing agent can be selected so as to influence the crystalline structure of the high density polyethylene that results in higher strength characteristics. The strength enhancing agent, for instance, can be a metal salt or alkali salt of a carboxylic acid or of a phosphate. Alternatively, the strength enhancing agent can be inorganic filler particles.

In one aspect, the strength enhancing agent, for instance, can be a metal salt of an aromatic phosphate or a metal salt of a cyclic dicarboxylic acid. Particular examples of strength enhancing agents include disodium. bicyclo[2.2.1]heptane-2,3-dicarboxylate, sodium 2,2'-methylenebis-(4,6-di-tert-butylphenyl) phosphate, lithium 2,2'-methylenebis-(4,6-di-tert-butylphenyl) phosphate, or mixtures thereof. In one embodiment, the strength enhancing agent includes a combination of sodium 2,2'-methylenebis-(4,6-di-tert-butylphenyl) phosphate and lithium 2,2'-methylenebis-(4,6-di-tert-butylphenyl) phosphate.

As described above, in an alternative embodiment, the strength enhancing agent can comprise an inorganic filler. The inorganic filler, for instance, can comprise titanium oxide particles. In other embodiments, the inorganic filler may comprise talc particles, clay particles, silicate particles, and/or hydrotalcite particles. The particles can generally have an average particle size (D50) of less than about 20 microns, such as less than about 15 microns, such as less than about 10 microns, such as less than about 8 microns, such as less than about 5 microns, such as less than about 3 microns, such as less than about 2 microns, such as less than about 1 micron, such as less than about 0.5 microns. The particle size can generally be greater than about 0.01 microns, such as greater than about 0.1 microns, such as greater than about 0.5 microns, such as greater than about 1 micron. The particle size can depend upon various factors including the type of inorganic particle incorporated into the composition.

The strength enhancing agent is generally added to the polymer composition such that polymer articles formed from the composition contain one or more strength enhancing agents in an amount greater than about 0.05% by weight, such as in an amount greater than about 0.08% by weight, such as in an amount greater than about 0.1% by weight, such as in an amount greater than about 0.2% by weight, and generally less than about 2.1% by weight, such as less than about 1.2% by weight, such as less than about 0.5% by weight.

When adding inorganic filler particles to the polymer composition, it was discovered that a relatively low amount of the particles are needed in order to significantly increase the physical properties of articles made from the composition. For instance, the inorganic filler can be added to the polymer composition and be present in the resulting article in an amount less than about 0.5% by weight, such as in an amount less than about 0.3% by weight, such as in an amount less than about 0.25% by weight, such as in an amount less than about 0.2% by weight, such as in an amount less than about 0.175% by weight. The inorganic particles are generally present in articles made according to the present disclosure in an amount greater than about 0.01% by weight, such as in an amount greater than about 0.08% by weight, such as in an amount greater than about 0.1% by weight, such as in an amount greater than about 0.12% by weight.

One or more strength enhancing agents are incorporated into the composition such that membranes made from the composition have a tensile strength increase in at least one direction or a puncture strength increase of at least about 2%, such as at least about 3%, such as at least about 4%, such as at least about 5%, such as at least about 6% in comparison to an identical membrane not containing any strength enhancing agents. In certain embodiments, the tensile strength and/or the puncture strength can be increased by greater than about 8%, such as greater than about 10%, such as greater than about 15%, such as greater than about 20%, such as greater than about 25%, such as greater than about 30%.

In formulating compositions according to the present disclosure, it was discovered that the ability of various strength enhancing agents to increase one or more physical properties was dependent upon various factors. For example, in one aspect, polymer compositions made according to the present disclosure are sorbitol-free and polypropylene-free. In addition, one or more strength enhancing agents are combined with particular types of high density polyethylene polymers. The polyethylene polymers, for instance, in one aspect, have a half-crystallization time period during an isothermal crystallization at 123° C. of greater than 2.5 minutes, such as greater than about 3.0 minutes, such as greater than about 3.5 minutes. In addition, polyethylene polymers selected for use in formulations of the present disclosure can also have a full width at half maximum of a melting endothermic peak when measured using a differential scanning calorimeter of greater than about 6 degrees C., such as greater than about 6.2 degrees C., such as greater than about 6.5 degrees C.

The high density polyethylene particles can, in one embodiment, have a median particle size by volume of less than about 150 microns, such as less than about 125 microns, and generally greater than about 50 microns.

In general, the polymer composition contains the high density polyethylene resin in an amount up to about 50% by weight. The plasticizer, for instance, can be present in the composition in an amount greater than about 50% by weight, such as in an amount greater than about 60% by weight, such as in an amount greater than about 70% by weight, such as in an amount greater than about 80% by weight, such as in an amount less than about 90% by weight. Various different materials can be used as the plasticizer. For instance, the plasticizer may comprise a mineral oil, a paraffinic oil, a hydrocarbon oil, an alcohol, or the like. For instance, the plasticizer may comprise decaline, xylene, dioctyl phthalate, dibutyl phthalate, stearyl alcohol, oleyl alcohol, decyl alcohol, nonyl alcohol, diphenyl ether, n-decane, n-dodecane, or mixtures thereof. In one embodiment, the plasticizer may comprise a C5-C12 hydrocarbon, such as a C5-C12 saturated hydrocarbon. For example, the plasticizer may comprise heptane, hexane, a paraffin, or the like.

In one embodiment, the high density polyethylene used to produce the particles can have a relatively high molecular weight. The use of higher molecular weight polyethylene particles may be beneficial, especially in applications where greater strength properties are needed or desired. For example, the polyethylene used to produce the particles can have a molecular weight of greater than about 500,000 g/mol, such as greater than about 650,000 g/mol, such as greater than about 1,000,000 g/mol, such as greater than about 1,500,000 g/mol, and less than about 4,000,000 g/mol, such as less than about 3,500,000 g/mol. In one embodiment, the polyethylene used to produce the particles comprises a Ziegler-Natta catalyzed high molecular weight polyethylene. In one embodiment, the composition only contains a single polyethylene polymer.

The present disclosure is also directed to polymer articles formed from the above polymer composition. The polymer articles can be produced through a gel extrusion or gel-spinning process. Polymer articles made in accordance with the present disclosure include fibers, films, such as membranes, or the like.

During the formation of polymer articles, a significant portion of the plasticizer is removed. For example, in one aspect, greater than 95% by weight, such as greater than about 98% by weight of the plasticizer is removed in forming the polymer article. Consequently, polymer articles made in accordance with the present disclosure generally contain the high density polyethylene combined with the strength enhancing agent. For example, the resulting polymer article can contain the high density polyethylene polymer in an amount from about 60% to about 98% by weight, such as in an amount from about 65% by weight to about 97% by weight. One or more strength enhancing agents can be present in the polymer article in an amount greater than about 0.05% by weight, such as in an amount greater than about 0.08% by weight, such as in an amount greater than about 0.1% by weight, and generally in an amount less than about 2.1% by weight, such as in an amount less than about 1.2% by weight, such as in an amount less than about 0.5% by weight.

The present disclosure is also directed to a process for producing polymer articles. The process includes the steps of forming a gel-like composition from the polymer composition described above. The gel-like composition is then extruded through a die to form a polymer article. The polymer article, for instance, may comprise fibers, a continuous film, or a discontinuous film, such as a porous membrane.

In one embodiment, an extraction solvent, such as dichloromethane is combined with the polymer composition before or during formation of the polymer article. The extraction solvent can be used to facilitate removal of the plasticizer.

Porous membranes made in accordance with the present disclosure can have an excellent blend of physical properties. For example, the membrane can have a puncture strength of greater than about 900 mN/μm, such as greater than about 950 mN/μm, such as greater than about 1020 mN/μm, such as greater than about 1030 mN/μm, such as greater than about 1040 mN/μm, such as greater than about 1050 mN/μm, such as greater than about 1100 mN/μm. The membrane can have a tensile strength in at least one direction of greater than about 144 MPa.

Other features and aspects of the present disclosure are discussed in greater detail below.

BRIEF DESCRIPTION OF THE DRAWINGS

The present disclosure may be better understood with reference to the following FIGURES:

FIG. 1 is a cross-sectional view of an electronic device, such as a battery, incorporating a porous membrane made in accordance with the present disclosure.

Repeat use of reference characters in the present specification and drawings is intended to represent the same or analogous features or elements of the present invention.

Definitions

As used herein, puncture strength is measured according to ASTM Test D3763 and measures the ability of a membrane to withstand a foreign particle from causing a hole or defect. The test is conducted on a testing device, such as an Instron CEAST 9340 device. The drop height is 0.03 to 1.10 m. The impact velocity is 0.77 to 4.65 m/s. The maximum dropping mass is 37.5 kg and the maximum potential energy is 405 J. Puncture strength is measured in slow speed puncture mode at 1.67 mm/s.

The melt flow rate of a polymer or polymer composition is measured according to ISO Test 1133 at 190° C. and at a load of 21.6 kg.

The density of a polymer is measured according to ISO Test 1183 in units of $g/cm^3$.

Average particle size (d50) is measured using laser diffraction/light scattering, such as a suitable Horiba light scattering device.

The average molecular weight of a polymer is determined using the Margolies' equation.

Tensile modulus, tensile stress at yield, tensile strain at yield, tensile stress at 50% break, tensile stress at break, and tensile nominal strain at break are all measured according to ISO Test 527-2/1B.

The full width at half maximum of a melting endothermic peak of a sample is measured with a differential scanning calorimeter (DSC). An electronic balance is used to measure 8.4 g of a sample. The sample is placed in an aluminum sample pan. An aluminum cover is attached to the pan, which is set in the differential scanning calorimeter. The sample and a reference sample are retained at 40° C. for one minute while nitrogen purge is performed at a flow rate of 20 mL/min then heated from 40° C. to 180° C. at a heating rate of 10° C./min, retained at 180° C. for 5 minutes, and then cooled to 40° C. at a cooling rate of 10° C./min. A baseline is drawn from 60° C. to 150° C. in the melting curve acquired during the process and the full width at half maximum of a melting endothermic peak is derived using analysis software, such as "Pyris Software (Version 7)." The test can be conducted using a DSC Q2000 calorimeter available from TA Instruments.

The half-crystallization period of time during an isothermal crystallization at 123° C. can be determined from the time that requires a quantity of heat measured during an isothermal crystallization measurement at 123° C. to correspond to the half of the peak area in differential scanning calorimetry (DSC) measurement. The test can be conducted using a DSC Q2000 calorimeter available from TA Instruments.

Gurley permeability can be measured according to the Gurley Test, using a Gurley permeability tester, such as Gurley Densometer, Model KRK 2060c commercially available from Kumagai Riki Kogyo Co., LTD. The test is conducted according to ISO Test 5636. The Gurley Test measures air permeability as a function of the time required for a specified amount of air to pass through a specified area under a specified pressure. The units are reported in sec/100 ml.

Porosity (%) is measured according to the following procedure. During the procedure, the following ASTM Standards are used as a reference: D622 Standard Test Method for Apparent Density of Rigid Cellular Plastics1; and D729 Standard Test Methods for Density and Specific Gravity (Relative Density) of Plastics by Displacement1. The following instruments are used: Calibrated Analytical Balance (0.0001 grams); Lorentzen&Wettre Micrometer, code 251 (0.1 um), and Deli 2056 art knife.

Procedure:

1.1. Samples and Sample Preparation
  Using the specimen art knife, cut each sample material into a minimum of three 60 mm±0.5 by 60 mm±0.5 specimens
1.2. Instrument and Measurement
  3.2.1 Using the L&W micrometer, take five readings of the thickness at each 60 mm by 60 mm specimen (average of 5 readings). Record this value as the thickness of this specimen.
  3.2.2 Weigh the specimen directly on the balance. Record this value as the weight of this specimen.
  3.2.3 The three specimens of the same sample are placed together and steps 2.2.1 and 3.2.2 are repeated to obtain the [bulk] thickness and the [bulk] weight.

Calculate the density to three significant FIGURES as follows a.  $D\text{film}=\text{Density(film)}=\text{Wt. of Specimen/THK*Square}$ Dfilm=density of specimen, mg/mm3
Wt=weight of specimen, mg
THK=thickness of specimen, mm
Square=area of specimen, (mm2)

b.  $D\text{polymer}=\text{Density(polymer)}\ 0.95\ (g/cm3)$

Dpolymer: Density of raw materials, without the pores.

c.  $\text{Porosity}=(1-D\text{film}/D\text{polymer})*100\%$

DETAILED DESCRIPTION

It is to be understood by one of ordinary skill in the art that the present discussion is a description of exemplary embodiments only and is not intended as limiting the broader aspects of the present disclosure.

In general, the present disclosure is directed to a polymer composition well suited for producing gel extruded articles, such as fibers and films, including porous membranes. The polymer composition contains a polyethylene resin, such as high density polyethylene particles, combined with a plasticizer and one or more strength enhancing agents. The strength enhancing agents can influence the crystal structure of the polyethylene polymer. Strength enhancing agents that may be used in accordance with the present disclosure include metal salts of carboxylic acids, metal salts of phosphates, such as aromatic phosphates, inorganic fillers and combinations thereof. The one or more strength enhancing agents are incorporated into the polymer composition an amount sufficient to increase at least one physical property of an article, such as a porous membrane, made from the composition. For example, one or more strength enhancing agents can be incorporated into the composition so as to increase the puncture strength, the tensile strength, or both in an amount of at least 2%, such as at least 3%, such as at least 4%, such as at least 5%, such as at least 6%, such as at least 8%, such as at least 10%, such as at least 12%, such as at least 15%, such as at least 17%, such as at least 20%, such as at least 22%, such as at least 25%, such as at least 27%, such as at least 30%, such as at least 32% when compared to a porous membrane made from the identical polymer composition not containing the one or more strength enhancing agents. In fact, it is believed that the puncture strength can be increased by up to 70%, such as up to 50% in accordance with the present disclosure.

Incorporating one or more strength enhancing agents into the polymer composition in a manner that enhances one or more physical properties is somewhat unpredictable. In accordance with the present disclosure, a particular polyethylene polymer is combined with one or more selected strength enhancing agents in order to increase puncture strength and/or tensile strength. Further, polymer compositions formulated in accordance with the present disclosure generally do not contain various components that have been found to possibly adversely impact one or more properties of an article formed from the composition. For instance, polymer compositions made in accordance with the present disclosure can be sorbitol-free and polypropylene-free. Sorbitols, for instance, are known nucleating agents for polyolefin polymers that were found to actually decrease the strength characteristics of articles made from gel extruded articles.

The polymer composition of the present disclosure contains a polyethylene polymer that is particularly well suited for combining with one or more strength enhancing agents. The polyethylene polymer can be a high density polyethylene polymer that is used to form the primary polymer component and the matrix polymer of the polymer composition. The high density polyethylene has a density of about 0.93 g/cm$^3$ or greater, such as about 0.94 g/cm$^3$ or greater, such as about 0.95 g/cm$^3$ or greater, and generally less than about 1 g/cm$^3$, such as less than about 0.96 g/cm$^3$.

The high density polyethylene polymer can be made from over 90% ethylene derived units, such as greater than 95% ethylene derived units, or from 100% ethylene derived units. The polyethylene can be a homopolymer or a copolymer, including a terpolymer, having other monomeric units.

The high density polyethylene can be a high molecular weight polyethylene, a very high molecular weight polyethylene, and/or an ultrahigh molecular weight polyethylene. "High molecular weight polyethylene" refers to polyethylene compositions with an average molecular weight of at least about 3×10$^5$ g/mol and, as used herein, is intended to include very-high molecular weight polyethylene and ultrahigh molecular weight polyethylene. For purposes of the present specification, the molecular weights referenced herein are determined in accordance with the Margolies equation ("Margolies molecular weight").

"Very-high molecular weight polyethylene" refers to polyethylene compositions with a weight average molecular weight of less than about 3×10$^6$ g/mol and more than about 1×10$^6$ g/mol. In some embodiments, the molecular weight of the very-high molecular weight polyethylene composition is between about 2×10$^6$ g/mol and less than about 3×10$^6$ g/mol.

"Ultra-high molecular weight polyethylene" refers to polyethylene compositions with an average molecular weight of at least about 3×10$^6$ g/mol. In some embodiments, the molecular weight of the ultra-high molecular weight polyethylene composition is between about 3×10$^6$ g/mol and about 30×10$^6$ g/mol, or between about 3×10$^6$ g/mol and about 20×10$^6$ g/mol, or between about 3×10$^6$ g/mol and about 10×10$^6$ g/mol, or between about 3×10$^6$ g/mol and about 6×10$^6$ g/mol.

In one aspect, the high density polyethylene is a homopolymer of ethylene. In another embodiment, the high density polyethylene may be a copolymer. For instance, the high density polyethylene may be a copolymer of ethylene and another olefin containing from 3 to 16 carbon atoms, such as from 3 to 10 carbon atoms, such as from 3 to 8 carbon atoms. These other olefins include, but are not limited to, propylene, 1-butene, 1-pentene, 1-hexene, 1-heptene, 1-octene, 4-methylpent-1-ene, 1-decene, 1-dodecene, 1-hexadecene and the like. Also utilizable herein are polyene comonomers such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene. However, when present, the amount of the non-ethylene monomer(s) in the copolymer may be less than about 10 mol. %, such as less than about 5 mol. %, such as less than about 2.5 mol. %, such as less than about 1 mol. %, wherein the mol. % is based on the total moles of monomer in the polymer.

In one embodiment, the high density polyethylene may have a monomodal molecular weight distribution. Alternatively, the high density polyethylene may exhibit a bimodal molecular weight distribution. For instance, a bimodal distribution generally refers to a polymer having a distinct higher molecular weight and a distinct lower molecular weight (e.g. two distinct peaks) on a size exclusion chromatography or gel permeation chromatography curve. In another embodiment, the high density polyethylene may exhibit more than two molecular weight distribution peaks such that the polyethylene exhibits a multimodal (e.g., trimodal, tetramodal, etc.) distribution. Alternatively, the high density polyethylene may exhibit a broad molecular weight distribution wherein the polyethylene is comprised of a blend of higher and lower molecular weight components such that the size exclusion chromatography or gel permeation chromatography curve does not exhibit at least two distinct peaks but instead exhibits one distinct peak broader than the individual component peaks.

Any method known in the art can be utilized to synthesize the polyethylene. The polyethylene powder is typically produced by the catalytic polymerization of ethylene monomer or optionally with one or more other 1-olefin co-monomers, the 1-olefin content in the final polymer being less or equal to 10% of the ethylene content, with a heterogeneous catalyst and an organo aluminum or magnesium compound as cocatalyst. The ethylene is usually polymerized in gaseous phase or slurry phase at relatively low temperatures and pressures. The polymerization reaction may be carried out at a temperature of between 50° C. and 100° C. and pressures in the range of 0.02 and 2 MPa.

The molecular weight of the polyethylene can be adjusted by adding hydrogen. Altering the temperature and/or the type and concentration of the co-catalyst may also be used to fine tune the molecular weight. Additionally, the reaction may occur in the presence of antistatic agents to avoid fouling and product contamination.

Suitable catalyst systems include but are not limited to Ziegler-Natta type catalysts. Typically Ziegler-Natta type catalysts are derived by a combination of transition metal compounds of Groups 4 to 8 of the Periodic Table and alkyl or hydride derivatives of metals from Groups 1 to 3 of the Periodic Table. Transition metal derivatives used usually comprise the metal halides or esters or combinations thereof. Exemplary Ziegler-Natta catalysts include those based on the reaction products of organo aluminum or magnesium compounds, such as for example but not limited to aluminum or magnesium alkyls and titanium, vanadium or chromium halides or esters. The heterogeneous catalyst might be either unsupported or supported on porous fine grained materials, such as silica or magnesium chloride. Such support can be added during synthesis of the catalyst or may be obtained as a chemical reaction product of the catalyst synthesis itself.

In one embodiment, a suitable catalyst system can be obtained by the reaction of a titanium(IV) compound with a trialkyl aluminum compound in an inert organic solvent at temperatures in the range of −40° C. to 100° C., preferably −20° C. to 50° C. The concentrations of the starting materials are in the range of 0.1 to 9 mol/L, preferably 0.2 to 5 mol/L, for the titanium(IV) compound and in the range of 0.01 to 1 mol/L, preferably 0.02 to 0.2 mol/L for the trialkyl aluminum compound. The titanium component is added to the aluminum component over a period of 0.1 min to 60 min, preferably 1 min to 30 min, the molar ratio of titanium and aluminum in the final mixture being in the range of 1:0.01 to 1:4.

In another embodiment, a suitable catalyst system is obtained by a one or two-step reaction of a titanium(IV) compound with a trialkyl aluminum compound in an inert organic solvent at temperatures in the range of −40° C. to 200° C., preferably −20° C. to 150° C. In the first step the titanium(IV) compound is reacted with the trialkyl aluminum compound at temperatures in the range of −40° C. to 100° C., preferably −20° C. to 50° C. using a molar ratio of titanium to aluminum in the range of 1:0.1 to 1:0.8. The concentrations of the starting materials are in the range of 0.1 to 9.1 mol/L, preferably 5 to 9.1 mol/L, for the titanium (IV) compound and in the range of 0.05 and 1 mol/L, preferably 0.1 to 0.9 mol/L for the trialkyl aluminum compound. The titanium component is added to the aluminum compound over a period of 0.1 min to 800 min, preferably 30 min to 600 min. In a second step, if applied, the reaction product obtained in the first step is treated with a trialkyl aluminum compound at temperatures in the range of −10° C. to 150° C., preferably 10° C. to 130° C. using a molar ratio of titanium to aluminum in the range of 1:0.01 to 1:5.

In yet another embodiment, a suitable catalyst system is obtained by a procedure wherein, in a first reaction stage, a magnesium alcoholate is reacted with a titanium chloride in an inert hydrocarbon at a temperature of 50° to 100° C. In a second reaction stage the reaction mixture formed is subjected to heat treatment for a period of about 10 to 100 hours at a temperature of 110° to 200° C. accompanied by evolution of alkyl chloride until no further alkyl chloride is evolved, and the solid is then freed from soluble reaction products by washing several times with a hydrocarbon.

In a further embodiment, catalysts supported on silica, such as for example the commercially available catalyst system Sylopol 5917 can also be used.

Using such catalyst systems, the polymerization is normally carried out in suspension at low pressure and temperature in one or multiple steps, continuous or batch. The polymerization temperature is typically in the range of 30° C. to 130° C., preferably is the range of 50° C. and 90° C. and the ethylene partial pressure is typically less than 10 MPa, preferably 0.05 and 5 MPa. Trialkyl aluminums, like for example but not limited to isoprenyl aluminum and triisobutyl aluminum, are used as co-catalyst such that the ratio of Al:Ti (co-catalyst versus catalyst) is in the range of 0.01 to 100:1, more preferably is the range of 0.03 to 50:1. The solvent is an inert organic solvent as typically used for Ziegler type polymerizations. Examples are butane, pentane, hexane, cyclohexene, octane, nonane, decane, their isomers and mixtures thereof. The polymer molecular mass is controlled through feeding hydrogen. The ratio of hydrogen partial pressure to ethylene partial pressure is in the range of 0 to 50, preferably the range of 0 to 10. The polymer is isolated and dried in a fluidized bed drier under nitrogen. The solvent may be removed through steam distillation in case of using high boiling solvents. Salts of long chain fatty acids may be added as a stabilizer. Typical examples are calcium, magnesium and zinc stearate.

Optionally, other catalysts such as Phillips catalysts, metallocenes and post metallocenes may be employed. Generally, a cocatalyst such as alumoxane or alkyl aluminum or alkyl magnesium compound is also employed. Other suitable catalyst systems include Group 4 metal complexes of phenolate ether ligands.

Polyethylene polymers particularly well suited for use in the present disclosure have a full width at half maximum of a melting endothermic peak when measured with a differential scanning calorimeter of greater than about 6 degrees C., such as greater than about 6.2 degrees C., such as greater than about 6.4 degrees C., such as greater than about 6.5 degrees C., such as greater than about 6.8 degrees C., and generally less than about 9 degrees C. The polyethylene polymer can also have a half-crystallization time period during an isothermal crystallization at 123° C. of greater than about 2 minutes, such as greater than about 2.5 minutes, such as greater than about 3.0 minutes, such as greater than about 3.5 minutes, such as greater than about 4.0 minutes, such as greater than about 4.5 minutes, and generally less than about 12 minutes. In the past, it was believed that polyethylene polymers having shorter times than those described above provided the most optimum results. The present inventors have discovered, however, that selected strength enhancing agents or selected combinations of strength enhancing agents can dramatically improve one or more strength properties of porous membranes made from polymer compositions containing polyethylene polymers as described above.

In accordance with the present disclosure, the high density polyethylene polymer is formed into particles and combined with a plasticizer. In one embodiment, the polyethylene particles are made from a polyethylene polymer having a relatively low bulk density as measured according to DIN53466. For instance, in one embodiment, the bulk density is generally less than about 0.4 g/cm$^3$, such as less than about 0.35 g/cm$^3$, such as less than about 0.33 g/cm$^3$, such as less than about 0.3 g/cm$^3$, such as less than about 0.28 g/cm$^3$, such as less than about 0.26 g/cm$^3$. The bulk density is generally greater than about 0.1 g/cm$^3$, such as greater than about 0.15 g/cm$^3$. In one embodiment, the polymer has a bulk density of from about 0.2 g/cm$^3$ to about 0.27 g/cm$^3$.

In one embodiment, the polyethylene particles can be a free-flowing powder. The particles can have a median particle size (d50) by volume of less than 200 microns. For example, the median particle size (d50) of the polyethylene particles can be less than about 150 microns, such as less than about 125 microns. The median particle size (d50) is generally greater than about 20 microns. The powder particle size can be measured utilizing a laser diffraction method according to ISO 13320.

In one embodiment, 90% of the polyethylene particles can have a particle size of less than about 250 microns. In other embodiments, 90% of the polyethylene particles can have a particle size of less than about 200 microns, such as less than about 170 microns.

The molecular weight of the polyethylene polymer can vary depending upon the particular application. The polyethylene polymer, for instance, may have an average molecular weight, as determined according to the Margolies equation. The molecular weight can be determined by first measuring the viscosity number according to DIN EN ISO Test 1628. Dry powder flow is measured using a 25 mm nozzle. The molecular weight is then calculated using the Margolies equation from the viscosity numbers. The average molecular weight is generally greater than about 300,000 g/mol, such as greater than about 500,000 g/mol, such as greater than about 650,000 g/mol, such as greater than about 1,000,000 g/mol, such as greater than about 2,000,000 g/mol, such as greater than about 2,500,000 g/mol, such as greater than about 3,000,000 g/mol, such as greater than about 4,000,000 g/mol. The average molecular weight is generally less than about 12,000,000 g/mol, such as less than about 10,000,000 g/mol. In one aspect, the number average molecular weight of the high density polyethylene polymer can be less than about 4,000,000 g/mol, such as less than about 3,000,000 g/mol.

In one aspect, the composition or membrane can include only a single polyethylene polymer. The single polyethylene polymer can have an average molecular weight of 650,000 g/mol or greater, such as greater than about 1,000,000 g/mol and generally less than 2,500,000 g/mol.

The polyethylene may have a viscosity number of from at least 100 mL/g, such as at least 500 mL/g, such as at least 550 mL/g, to less than about 6,000 mL/g, such as less than about 5,000 mL/g, such as less than about 4000 mL/g, such as less than about 3,000 mL/g, such as less than about 1,000 mL/g, as determined according to ISO 1628 part 3 utilizing a concentration in decahydronapthalene of 0.0002 g/mL.

The high density polyethylene may have a crystallinity of from at least about 40% to 85%, such as from 45% to 80%. In one aspect, the crystallinity can be greater than about 50%, such as greater than about 55%, such as greater than about 60%, such as greater than about 65%, such as greater than about 70%, and generally less than about 80%.

In general, the high density polyethylene particles are present in the polymer composition in an amount up to about 50% by weight. For instance, the high density polyethylene particles can be present in the polymer composition in an amount less than about 45% by weight, such as in an amount less than about 40% by weight, such as in an amount less than about 35% by weight, such as in an amount less than about 30% by weight, such as in an amount less than about 25% by weight, such as in an amount less than about 20% by weight, such as in an amount less than about 15% by weight. The polyethylene particles can be present in the composition in an amount greater than about 5% by weight, such as in an amount greater than about 10% by weight, such as in an amount greater than about 15% by weight, such as in an amount greater than about 20% by weight, such as in an amount greater than about 25% by weight. During gel processing, a plasticizer is combined with the high density polyethylene particles which can be substantially or completely removed in forming polymer articles. For example, in one embodiment, the resulting polymer article can contain the high density polyethylene polymer in an amount greater than about 70% by weight, such as in an amount greater than about 80% by weight, such as in an amount greater than about 85% by weight, such as in an amount greater than about 90% by weight, such as in an amount greater than about 95% by weight.

In accordance with the present disclosure, the polymer composition for producing gel extruded articles contains one or more strength enhancing agents in combination with the high density polyethylene particles. The one or more strength enhancing agents are combined with the polyethylene polymer prior to being combined with the plasticizer or can be combined with the polyethylene polymer and plasticizer at the same time. In one aspect, the one or more strength enhancing agents can be pre-compounded with the polyethylene polymer to form the polymer particles that are then combined with the plasticizer.

Strength enhancing agents that may be used in accordance with the present disclosure include metal salts or alkali salts of one or more carboxylic acids, such as metal salts of dicarboxylic acids. In one aspect, a metal salt or alkali salt of a cyclic carboxylic acid may be used. Other strength enhancing agents that may be used in accordance with the present disclosure include metal salts or alkali salts of one or more phosphates. In one aspect, for instance, the strength enhancing agent is a metal salt or alkali salt of an aromatic phosphate. In still another aspect, the strength enhancing agent can be an inorganic filler.

Various mixtures of strength enhancing agents may also be incorporated into the composition. For instance, in one aspect, two different phosphate salts may be used. Alternatively, a phosphate salt can be combined with a salt of a carboxylic acid. In still another embodiment, the composition may contain a salt of a carboxylic acid combined with two different phosphate salts.

In one aspect, for example, the strength enhancing agent can be a bicyclic dicarboxylate metal salt having the following chemical structure:

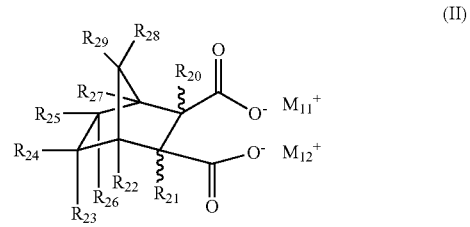

(II)

where $M_{11}$ and $M_{12}$ are the same or different, or $M_{11}$ and $M_{12}$ are combined to form a single moiety and are independently selected from the group consisting of metal or organic cations. Preferably $M_{11}$ and $M_{12}$ (or the single moiety from the combined $M_{11}$ and $M_{12}$) are selected from the group consisting of sodium, calcium, strontium, lithium, zinc, magnesium, and monobasic aluminum. Wherein $R_{20}$, $R_{21}$, $R_{22}$, $R_{23}$, $R_{24}$, $R_{25}$, $R_{26}$, $R_{27}$, $R_{28}$, and $R_{29}$ are independently selected from the group consisting of hydrogen and $C_1$-$C_9$ alkyls; and further wherein any two adjacently positioned $R_{22}$-$R_{29}$ alkyl groups optionally may be combined to form a carbocyclic ring. Preferably, $R_{22}$-$R_{29}$ are hydrogen and $M_{11}$ and $M_{12}$ are a sodium cations.

In one particular embodiment, the strength enhancing agent comprises disodium bicyclo[2.2.1]heptane-2,3-dicarboxylate, and can have the following chemical structure:

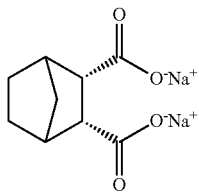

IIA

In another embodiment, the strength enhancing agent can be a phosphoric acid ester metal salt that can have the following chemical structure:

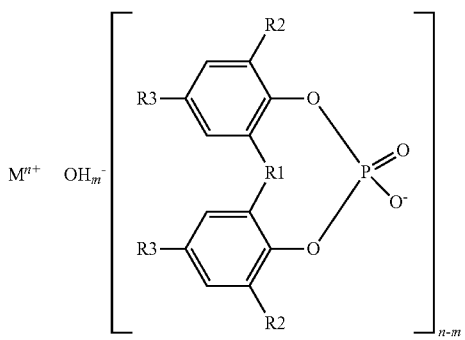

wherein $R_1$ is oxygen, sulfur or a hydrocarbon group of 1 to 10 carbon atoms; each of $R_2$ and $R_3$ is hydrogen or a hydrocarbon or a hydrocarbon group of 1 to 10 carbon atoms; $R_2$ and $R_3$ may be the same or different from each other; two of $R_2$, two of $R_3$, or $R_2$ and $R_3$ may be bonded together to form a ring; M is a monovalent to trivalent metal atom; n is an integer from 1 to 3; and m is either 0 or 1, provided that n>m.

Examples of strength enhancing agents represented by the above formula include sodium-2,2'-methylene-bis(4,6-di-t-butyl-phenyl)phosphate, sodium-2,2'-ethylidene-bis(4,6-di-t-butylphenyl)-phosphate, lithium-2,2'-methylene-bis(4,6-di-t-butylphenyl)phosphate, lithium-2,2'-ethylidene-bis(4,6-di-t-butylphenyl)phosphate, sodium-2,2'-ethylidene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6-t-butylphenyl)phosphate, calcium-bis[2,2'-thiobis(4-methyl-6-t-butyl-phenyl)-phosphate], calcium-bis[2,2'-thiobis(4-ethyl-6-t-butylphenyl)-phosphate], calcium-bis[2,2'-thiobis(4,6-di-t-butylphenyl)phosphate], magnesium-bis[2,2'-thiobis(4,6-di-t-butylphenyl) phosphate], magnesium-bis[2,2'-thiobis(4-t-octylphenyl) phosphate], sodium-2,2'-butylidene-bis(4,6-dimethylphenyl)phosphate, sodium-2,2'-butylidene-bis(4,6-di-t-butyl-phenyl)-phosphate, sodium-2,2'-t-octylmethylene-bis(4,6-dimethyl-phenyl)-phosphate, sodium-2,2'-t-octylmethylene-bis(4,6-di-t-butylphenyl)-phosphate, calcium-bis[2,2'-methylene-bis(4,6-di-t-butylphenyl)-phosphate], magnesium-bis[2,2'-methylene-bis(4,6-di-t-butylphenyl)-phosphate], barium-bis[2,2'-methylene-bis(4,6-di-t-butylphenyl)-phosphate], sodium-2,2'-methylene-bis(4-methyl-6-t-butylphenyl)-phosphate, sodium-2,2'-methylene-bis(4-ethyl-6-t-butylphenyl)phosphate, sodium(4,4'-dimethyl-5,6'-di-t-butyl-2,2'-biphenyl) phosphate, calcium-bis-[(4,4'-dimethyl-6,6'-di-t-butyl-2,2'-biphenyl)phosphate], sodium-2,2'-ethylidene-bis(4-m-butyl-6-t-butyl-phenyl)phosphate, sodium-2,2'-methylene-bis-(4,6-di-methylphenyl)-phosphate, sodium-2,2'-methylene-bis(4,6-di-t-ethyl-phenyl)phosphate, potassium-2,2'-ethylidene-bis(4,6-di-t-butylphenyl)-phosphate, calcium-bis[2,2'-ethylidene-bis(4,6-di-t-butylphenyl)-phosphate], magnesium-bis[2,2'-ethylidene-bis(4,6-di-t-butylphenyl)-phosphate], barium-bis[2,2'-ethylidene-bis-(4,6-di-t-butylphenyl)-phosphate], aluminium-hydroxy-bis[2,2'-methylene-bis(4,6-di-t-butyl-phenyl)phosphate], aluminium-tris[2,2'-ethylidene-bis(4,6-di-t-butylphenyl)-phosphate].

In one particular embodiment, the strength enhancing agent may comprise sodium 2,2'-methylenebis-(4,6-di-tert-butylphenyl) phosphate, lithium 2,2'-methylenebis-(4,6-di-tert-butylphenyl) phosphate, or mixtures thereof.

In one aspect, the polymer composition contains a blend of sodium 2,2'-methylenebis-(4,6-di-tert-butylphenyl) phosphate, lithium 2,2'-methylenebis-(4,6-di-tert-butylphenyl) phosphate, or mixtures thereof. The above two strength enhancing agents can be present at a weight ratio of from about 2:1 to about 1:2 in one aspect. In another aspect, the weight ratio can be from about 10:1 to about to about 1.5:1. In still another aspect, the weight ratio can be from about 1:8 to about to about 1:1.5.

In another aspect, the strength enhancing agent can be an inorganic filler. The inorganic filler can be used alone or in conjunction with the other strength enhancing agents described above. Inorganic fillers that may be used in accordance with the present disclosure include titanium oxide particles, talc particles, clay particles, silicate particles, hydrotalcite particles, and the like. The particles can have a relatively small average particle size. For instance, the particles can have an average particle size of less than about 20 microns, such as less than about 12 microns, such as less than about 8 microns, such as less than about 6 microns, such as less than about 4 microns, such as less than about 2 microns, such as less than about 1.5 microns, such as less than about 1 micron, such as less than about 0.5 microns, such as less than about 0.3 microns. The particle size is generally greater than about 0.001 microns, such as greater than about 0.01 microns, such as greater than about 0.1 micron.

The strength enhancing agents described above can influence the crystalline structure of the polyethylene polymer. It was discovered, however, that other compounds that can also influence the crystalline structure of the polyethylene polymer may not function according to the present disclosure. For instance, it was discovered that adding a sorbitol to the polymer composition can actually decrease various strength characteristics. Thus, in one embodiment, the polymer composition of the present disclosure is sorbitol-free. The above demonstrates the unpredictability of the use of strength enhancing agents. Consequently, the present disclosure is directed to combining particular polyethylene polymers with particular strength enhancing agents for optimizing strength properties of articles made from the composition.

In this regard, the amount of one or more strength enhancing agents incorporated into the polymer composition and to polymer articles made from the composition can vary depending upon various factors. In general, one or more strength enhancing agents are incorporated into the polymer composition such that porous membranes made from the composition have an increase in puncture strength and/or tensile strength (in at least one direction) by at least 1%, such as by at least about 2%, such as by at least about 3%, such as at least about 4%, such as at least about 5%, such as at least about 6%. For example, puncture strength and/or tensile strength can be increased by greater than about 8%, such as greater than about 10%, such as greater than about 12%, such as greater than about 15%, such as greater than about 17%, such as greater than about 20%, such as greater than about 22%, such as greater than about 25%, such as greater than about 27%, such as greater than about 30%, such as greater than about 32%. As is well known in the art, any increases in the strength of porous membranes can be significant when incorporated into batteries and other similar electronic devices.

In one aspect, polymer articles, such as polymer membranes, made in accordance with the present disclosure, can contain one or more strength enhancing agents in an amount greater than about 0.01% by weight, such as in an amount greater than about 0.05% by weight, such as in an amount greater than about 0.08% by weight, such as in an amount greater than about 1.1% by weight. One or more strength enhancing agents can be present in the polymer article in an amount less than about 2.1% by weight, such as in an amount less than about 1.2% by weight, such as in an amount less than about 0.5% by weight.

When the strength enhancing agent is a dicarboxylate metal salt or a phosphate ester, the strength enhancing agent can be present in the polymer article generally in an amount greater than about 0.3% by weight, such as in an amount greater than about 0.5% by weight, such as in an amount greater than about 0.8% by weight, such as in an amount greater than about 1% by weight, such as in an amount greater than about 1.2% by weight and generally in an amount less than about 2% by weight.

It was discovered that inorganic fillers may be added in lower amounts. For instance, when the strength enhancing agent is an inorganic filler, the polymer article may contain the strength enhancing agent in an amount less than about 1% by weight, such as in an amount less than about 0.8% by weight, such as in an amount less than about 0.7% by weight, such as in an amount less than about 0.6% by weight, and generally in an amount greater than about 0.01% by weight, such as in an amount greater than about 0.1% by weight, such as in an amount greater than about 0.2% by weight, such as in an amount greater than about 0.4% by weight.

The effect that one or more strength enhancing additives has on polymer articles made in accordance with the present disclosure can depend upon various factors. Thus, the final strength properties of any porous membranes made in accordance with the present disclosure can change depending upon the particular polyethylene polymer selected in conjunction with the type and amount of enhancing additives combined with the polymer. In one aspect, for instance, a microporous membrane can be made in accordance with the present disclosure that has a tensile strength in one direction of greater than about 140 MPa, such as greater than about 144 MPa, such as greater than about 145 MPa, such as greater than about 146 MPa, and generally less than about 250 MPa. The puncture strength, in one aspect, can be greater than about 900 mN/μm, such as greater than about 950 mN/μm, such as greater than about 1000 mN/μm, such as greater than about 1020 mN/μm, such as greater than about 1030 mN/μm, such as greater than about 1040 mN/μm, such as greater than about 1050 mN/μm, and generally less than about 3000 mN/μm, such as less than about 2000 mN/μm.

In addition to the high density polyethylene particles and the at least one strength enhancing agent, the polymer composition further contains a plasticizer. In general, any suitable plasticizer can be combined with the other components as long as the plasticizer is capable of forming a gel-like material suitable for gel spinning or extruding.

The plasticizer, for instance, may comprise a hydrocarbon oil, an alcohol, an ether, an ester such as a diester, or mixtures thereof. For instance, suitable plasticizers include mineral oil, a paraffinic oil, decaline, and the like. Other plasticizers include xylene, dioctyl phthalate, dibutyl phthalate, stearyl alcohol, oleyl alcohol, decyl alcohol, nonyl alcohol, diphenyl ether, n-decane, n-dodecane, octane, nonane, kerosene, toluene, naphthalene, tetraline, and the like. In one embodiment, the plasticizer may comprise a halogenated hydrocarbon, such as monochlorobenzene. Cycloalkanes and cycloalkenes may also be used, such as camphene, methane, dipentene, methylcyclopentandiene, tricyclodecane, 1,2,4,5-tetramethyl-1,4-cyclohexadiene, and the like. The plasticizer may comprise mixtures and combinations of any of the above as well.

The plasticizer is generally present in the composition used to form the polymer articles in an amount greater than about 50% by weight, such as in an amount greater than about 55% by weight, such as in an amount greater than about 60% by weight, such as in an amount greater than about 65% by weight, such as in an amount greater than about 70% by weight, such as in an amount greater than about 75% by weight, such as in an amount greater than about 80% by weight, such as in an amount greater than about 85% by weight, such as in an amount greater than about 90% by weight, such as in an amount greater than about 95% by weight, such as in an amount greater than about 98% by weight. In fact, the plasticizer can be present in an amount up to about 99.5% by weight.

The high density polyethylene particles and strength enhancing agent blend with the plasticizer to form a homogeneous gel-like material.

In order to form polymer articles in accordance with the present disclosure, the high density polyethylene particles are combined with one or more strength enhancing additives and the plasticizer and extruded through a die of a desired shape. In one embodiment, the composition can be heated within the extruder. For example, the plasticizer can be combined with the particle mixture and fed into an extruder. In accordance with the present disclosure, the plasticizer and particle mixture form a homogeneous gel-like material prior to leaving the extruder for forming polymer articles with little to no impurities.

In one embodiment, elongated articles are formed during the gel spinning or extruding process. The polymer article, for instance, may be in the form of a fiber or a film, such as a membrane.

During the process, at least a portion of the plasticizer is removed from the final product. The plasticizer removal process may occur due to evaporation when a relatively volatile plasticizer is used. Otherwise, an extraction liquid can be used to remove the plasticizer. The extraction liquid may comprise, for instance, a hydrocarbon solvent. One example of the extraction liquid, for instance, is dichloromethane. Other extraction liquids include acetone, chloroform, an alkane, hexene, heptene, an alcohol, or mixtures thereof.

If desired, the resulting polymer article can be stretched at an elevated temperature below the melting point of the polymer mixture to increase strength and modulus. Suitable temperatures for stretching are in the range of from about ambient temperature to about 155° C. The draw ratios can generally be greater than about 4, such as greater than about 6, such as greater than about 8, such as greater than about 10, such as greater than about 15, such as greater than about 20, such as greater than about 25, such as greater than about 30. In certain embodiments, the draw ratio can be greater than about 50, such as greater than about 100, such as greater than about 110, such as greater than about 120, such as greater than about 130, such as greater than about 140, such as greater than about 150. Draw ratios are generally less than about 1,000, such as less than about 800, such as less than about 600, such as less than about 400. In one embodiment, lower draw ratios are used such as from about 4 to about 10. The polymer article can be uniaxially stretched or biaxially stretched.

Polymer articles made in accordance with the present disclosure have numerous uses and applications. For example, in one embodiment, the process is used to produce a membrane. The membrane can be used, for instance, as a battery separator. Alternatively, the membrane can be used as a microfilter. When producing fibers, the fibers can be used to produce nonwoven fabrics, ropes, nets, and the like. In one embodiment, the fibers can be used as a filler material in ballistic apparel.

Referring to FIG. 1, one embodiment of a lithium ion battery 10 made in accordance with the present disclosure is shown. The battery 10 includes an anode 12 and a cathode 14. The anode 12, for instance, can be made from a lithium metal. The cathode 14, on the other hand, can be made from sulfur or from an intercalated lithium metal oxide. In accordance with the present disclosure, the battery 10 further includes a porous membrane 16 or separator that is positioned between the anode 12 and the cathode 14. The porous membrane 16 minimizes electrical shorts between the two electrodes while allowing the passage of ions, such as lithium ions. As shown in FIG. 1, in one embodiment, the porous membrane 16 is a single layer polymer membrane and does not include a multilayer structure. In one aspect, the single layer polymer membrane may also include a coating. The coating can be an inorganic coating made from, for instance, aluminum oxide or a titanium oxide. Alternatively, the single layer polymer membrane may also include a polymeric coating. The coating can provide increased thermal resistance.

The polymer composition and polymer articles made in accordance with the present disclosure may contain various other additives, such as heat stabilizers, light stabilizers, UV absorbers, acid scavengers, flame retardants, lubricants, colorants, and the like.

In one embodiment, a heat stabilizer may be present in the composition. The heat stabilizer may include, but is not limited to, phosphites, aminic antioxidants, phenolic antioxidants, or any combination thereof.

In one embodiment, an antioxidant may be present in the composition. The antioxidant may include, but is not limited to, secondary aromatic amines, benzofuranones, sterically hindered phenols, or any combination thereof.

In one embodiment, a light stabilizer may be present in the composition. The light stabilizer may include, but is not limited to, 2-(2'-hydroxyphenyl)-benzotriazoles, 2-hydroxy-4-alkoxybenzophenones, nickel containing light stabilizers, 3,5-di-tert-butyl-4-hydroxbenzoates, sterically hindered amines (HALS), or any combination thereof.

In one embodiment, a UV absorber may be present in the composition in lieu of or in addition to the light stabilizer. The UV absorber may include, but is not limited to, a benzotriazole, a benzoate, or a combination thereof, or any combination thereof.

In one embodiment, a halogenated flame retardant may be present in the composition. The halogenated flame retardant may include, but is not limited to, tetrabromobisphenol A (TBBA), tetrabromophthalic acid anhydride, dedecachloropentacyclooctadecadiene (dechlorane), hexabromocyclodedecane, chlorinated paraffins, or any combination thereof.

In one embodiment, a non-halogenated flame retardant may be present in the composition. The non-halogenated flame retardant may include, but is not limited to, resorcinol diphosphoric acid tetraphenyl ester (RDP), ammonium polyphosphate (APP), phosphine acid derivatives, friaryl phosphates, trichloropropylphosphate (TCPP), magnesium hydroxide, aluminum trihydroxide, antimony trioxide.

In one embodiment, a lubricant may be present in the composition. The lubricant may include, but is not limited to, silicone oil, waxes, molybdenum disulfide, or any combination thereof.

In one embodiment, a colorant may be present in the composition. The colorant may include, but is not limited to, inorganic and organic based color pigments.

In one aspect, an acid scavenger may be present in the polymer composition. The acid scavenger, for instance, may comprise an alkali metal salt or an alkaline earth metal salt. The salt can comprise a salt of a fatty acid, such as a stearate. Other acid scavengers include carbonates, oxides, or hydroxides. Particular acid scavengers that may be incorporated into the polymer composition include a metal stearate, such as calcium stearate. Still other acid scavengers include zinc oxide, calcium carbonate, magnesium oxide, and mixtures thereof.

These additives may be used singly or in any combination thereof. In general, each additive may be present in an amount of at least about 0.05 wt. %, such as at last about 0.1 wt. %, such as at least about 0.25 wt. %, such as at least about 0.5 wt. %, such as at least about 1 wt. % and generally less than about 20 wt. %, such as less than about 10 wt. %, such as less than about 5 wt. %, such as less than about 4 wt. %, such as less than about 2 wt. %. The sum of the wt. % of all of the components, including any additives if present, utilized in the polymer composition will be 100 wt. %.

The present disclosure may be better understood with reference to the following example. The following example is given below by way of illustration and not by way of limitation. The following experiments were conducted in order to show some of the benefits and advantages of the present invention.

Example 1

Various resin compositions were formulated containing a base resin of high density polyethylene with various strength enhancing agents. The strength enhancing agents were blended with high density polyethylene using a tumble blender. The resin compositions were prepared into membranes via gel extrusion, biaxial stretching, and solvent extraction as are conventional.

The polyethylene polymer used in the samples had an average molecular weight of about 700,000 g/mol and an average particle size of about 115 microns. The polymer had a melt flow rate of 0.5 g/10 min and had a density of 0.94 g/cm$^3$. The polymer had a viscosity number of 600 cm$^3$/g when measured according to ISO Test 1628-3. The polyethylene polymer was a homopolymer that possessed a half crystallization time period during an isothermal crystallization at 123° C. of greater than 2 minutes and displayed a full width at half maximum of a melting endothermic peak of a sample of greater than 6 degrees C.

The following strength enhancing additives were investigated:

| Sample No. | Chemical Composition |
|---|---|
| 1 | Disodium bicyclo[2.2.1]heptane-2,3-dicarboxylate |
| 2 | 1,3:2,4-bis(3,4-dimethylbenzylidene) sorbitol |
| 3 | Sodium 2,2'-Methylenebis-(4,6-di-tert-butylphenyl) phosphate |
| 4 | Blend of Sample No. 3 and Sample No. 5 |
| 5 | Lithium 2,2'-Methylenebis-(4,6-di-ter-butylphenyl) phosphate |

The strength enhancing additives were blended with the polyethylene polymer at a loading level of 0.3 wt. %. The blends were gel extruded using a solid content of 30 wt. % resin and paraffin oil at a temperature of from about 190° C. to about 240° C. and a screw speed of 200 rpm. After extrusion, the resulting membrane was solidified on a chill roller set to 40° C. Stretching was performed in a 7×7 ratio (MD/TD) at a temperature of 120° C. Extraction of the stretched membranes was performed in acetone. The membranes were annealed at 130° C. for 10 minutes.

The membranes were then tested for strength properties. The following results were obtained and compared to the control sample that did not contain any strength enhancing additives.

| Sample No. | Tensile MD (MPa) | Tensile TD (MPa) | Puncture Strength (mN/μm) | Tensile MD (% of Ref) | Tensile TD (% of Ref) | Puncture Strength (% of Ref) |
|---|---|---|---|---|---|---|
| Control | 142.0 | 144.9 | 1001.9 | 100 | 100 | 100 |
| 1 | 149.4 | 145.2 | 1068.2 | 105 | 100 | 107 |
| 2 | 133.6 | 129.8 | 857.0 | 94 | 90 | 86 |
| 3 | 139.6 | 152.5 | 1057.7 | 98 | 105 | 106 |
| 4 | 144.7 | 145.2 | 963.3 | 102 | 100 | 96 |
| 5 | 142.6 | 152.9 | 1083.2 | 100 | 106 | 108 |

As shown above, use of a sorbitol actually decreased the strength characteristics of the membrane. The other strength enhancing additives all increased at least one of tensile strength or puncture strength.

Example 2

The procedures of Example 1 were repeated using a different base resin and different formulations containing strength enhancing agents.

The polyethylene polymer used had an average molecular weight of about 1,700,000 g/mol and an average particle size of about 135 microns. The polymer had a melt flow rate of less than 0.1 g/10 min. The polyethylene polymer was a homopolymer.

The following strength enhancing additives were investigated:

| Sample No. | Chemical Composition |
|---|---|
| 6 | Sodium 2,2'-Methylenebis-(4,6-di-tert-butylphenyl) phosphate |
| 7 | Blend of Sample No. 3 and Sample No. 5 |
| 8 | Sodium 2,2'-Methylenebis-(4,6-di-tert-butylphenyl) phosphate |
| 9 | Blend of Sample No. 3 and Sample No. 5 |
| 10 | Titanium oxide particles |
| 11 | Titanium oxide particles |

Membranes were made using the procedures described in Example 1. The loading level, however, was varied between 0.15% by weight and 0.3% by weight (in the produced membrane) as indicated in the table below. The following results were obtained and compared to a control sample that did not contain any strength enhancing additives.

| Sample No. | Loading (wt. %) | Tensile MD (MPa) | Tensile TD (MPa) | Puncture Strength (mN/μm) | Tensile MD (% of Ref) | Tensile TD (% of Ref) | Puncture Strength (% of Ref) |
|---|---|---|---|---|---|---|---|
| Control | na | 131.2 | 90.0 | 831.8 | 0 | 0 | 0 |
| 6 | 0.15 | 112.3 | 106.8 | 918.7 | −14 | 19 | 10 |
| 7 | 0.15 | 127.0 | 110.2 | 1058.0 | −3 | 22 | 27 |
| 8 | 0.3 | 128.0 | 105.0 | 961.8 | −2 | 17 | 16 |
| 9 | 0.3 | 134.1 | 102.2 | 1117.5 | 2 | 14 | 34 |
| 10 | 0.15 | 136.1 | 129.3 | 1071.3 | 4 | 44 | 29 |
| 11 | 0.3 | 136.7 | 124.1 | 918.1 | 4 | 38 | 10 |

All of the samples from Example 1 and 2 above were also tested for porosity, permeability and elongation. The following results were obtained:

| Sample No. | Porosity (%) | Permeability (sec/100 ml) | Elongation MD | Elongation TD |
|---|---|---|---|---|
| Control | 43.8 | 110.9 | 81.7 | 70.5 |
| 1 | 44.8 | 130.2 | 75.2 | 62.6 |
| 2 | 47.3 | 133.4 | 77.9 | 67.7 |
| 3 | 46.1 | 95.8 | 90.6 | 60.7 |
| 4 | 46.1 | 122.5 | 72.7 | 62.6 |
| 5 | 42.9 | 98.4 | 78.3 | 70.5 |
| Control | 52.1 | 252.1 | 57.4 | 76.8 |
| 6 | 47.8 | 243.6 | 54.3 | 62.2 |
| 7 | 48.7 | 195.3 | 51.8 | 64.7 |
| 8 | 49.5 | 225.5 | 64.0 | 89.8 |
| 9 | 46.5 | 191.8 | 67.2 | 90.9 |
| 10 | 47.5 | 281.7 | 82.3 | 124.1 |
| 11 | 46.6 | 283.7 | 135.4 | 114.2 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polymer composition for producing gel extruded articles comprising:
   a plasticizer;
   high density polyethylene particles, wherein the high density polyethylene particles are formed from high density polyethylene polymer that has a half crystallization time period during an isothermal crystallization at 123° C. of greater than 2.5 minutes; and one or more strength enhancing agents that influences the crystalline structure of the high density polyethylene particles, the one or more strength enhancing agents comprising a metal salt of a carboxylic acid, a metal salt of a phosphate, an inorganic filler or mixtures thereof, the one or more strength enhancing agents being present in the polymer composition in an amount sufficient for a membrane made from the polymer composition to have an increase in tensile strength in at least one direction or an increase in puncture strength of greater than about 2%.

2. A polymer composition as defined in claim 1, wherein the high density polyethylene particles are formed from a high density polyethylene polymer that has a full width at half maximum of a melting endothermic peak of greater than 6 degrees C. when measured using a differential scanning calorimeter when tested at an isothermal temperature of 40° C.

3. A polymer composition as defined in claim 1, wherein the polymer composition is sorbitol-free.

4. A polymer composition as defined in claim 1, wherein the one or more strength enhancing agents comprise a metal salt of an aromatic phosphate.

5. A polymer composition as defined in claim 1, wherein the one or more strength enhancing agents comprise a metal salt of a cyclic dicarboxylic acid.

6. A polymer composition as defined in claim 1, wherein the one or more strength enhancing agents comprise disodium bicyclo[2.2.1]heptane-2,3-dicarboxylate, sodium 2,2'-methylenebis-(4,6-di-tert-butylphenyl) phosphate, lithium 2,2'-methylenebis-(4,6-di-tert-butylphenyl) phosphate, or mixtures thereof.

7. A polymer composition as defined in claim 1, wherein the one or more strength enhancing agents comprise a mixture of sodium 2,2'-methylenebis-(4,6-di-tert-butylphenyl) phosphate and lithium 2,2'-methylenebis-(4,6-di-tert-butylphenyl) phosphate.

8. A polymer composition as defined in claim 1, wherein the one or more strength enhancing agents comprise the inorganic filler, the inorganic filler comprising titanium dioxide particles, talc particles, silicate particles, hydrotalcite particles, or mixtures thereof.

9. A polymer composition as defined in claim 1, wherein the one or more strength enhancing agents are present in the polymer composition in an amount from about 0.001% to about 1% by weight.

10. A polymer composition as defined in claim 1, wherein the high density polyethylene particles have a median particle size by volume of from about 70 microns to about 210 microns.

11. A polymer composition as defined in claim 1, wherein the high density polyethylene polymer has a molecular weight of greater than about 600,000 g/mol and less than about 4,000,000 g/mol, and wherein the polymer composition only contains a single high density polyethylene polymer.

12. A polymer composition as defined in claim 1, wherein the polymer composition is polypropylene-free.

13. A process for producing polymer articles comprising:
forming the polymer composition as defined in claim 1 into a gel-like composition; and
extruding the gel-like composition through a die to form a polymer article, the polymer article comprising a film.

14. A porous membrane comprising:
a polymer composition comprising a high density polyethylene combined with one or more strength enhancing agents, the one or more strength enhancing agents being present in the polymer composition in an amount sufficient for a membrane made from the polymer composition to have an increase in tensile strength in at least one direction or an increase in puncture strength of greater than about 2%, the one or more strength enhancing agents comprising a metal salt of a carboxylic acid, a metal salt of a phosphate, an inorganic filler, or mixtures thereof, the porous membrane being sorbitol-free and polypropylene-free, the high density polyethylene polymer having a half crystallization time period during an isothermal crystallization at 123° C. of greater than 2 minutes.

15. A porous membrane as defined in claim 14, wherein the membrane has a tensile strength in at least one direction of greater than about 144 MPa.

16. A porous membrane as defined in claim 14, wherein the porous membrane has a puncture strength of greater than about 1020 m N/μm.

17. A porous membrane as defined in claim 14, wherein the one or more strength enhancing agents comprise disodium bicyclo[2.2.1]heptane-2,3-dicarboxylate, sodium 2,2'-methylenebis-(4,6-di-tert-butylphenyl) phosphate, lithium 2,2'-methylenebis-(4,6-di-tert-butylphenyl) phosphate, or mixtures thereof.

18. A porous membrane as defined in claim 14, wherein the one or more strength enhancing agents comprise a mixture of sodium 2,2'-methylenebis-(4,6-di-tert-butylphenyl) phosphate, lithium 2,2'-methylenebis-(4,6-di-tert-butylphenyl) phosphate.

19. A porous membrane as defined in claim 14, wherein the one or more strength enhancing agents comprise the inorganic filler, and wherein the inorganic filler comprises titanium dioxide particles, silicate particles, talc particles, hydrotalcite particles, or mixtures thereof.

20. A polymer composition for producing gel extruded articles comprising:
a plasticizer;
high density polyethylene particles, wherein the high density polyethylene particles are formed from a high density polyethylene polymer that has a full width at half maximum of a melting endothermic peak of greater than 6 degrees C. when measured using a differential scanning calorimeter when tested at an isothermal temperature of 40° C.; and
one or more strength enhancing agents that influences the crystalline structure of the high density polyethylene particles, the one or more strength enhancing agents comprising a metal salt of a carboxylic acid, a metal salt of a phosphate, an inorganic filler or mixtures thereof, the one or more strength enhancing agents being present in the polymer composition in an amount sufficient for a membrane made from the polymer composition to have an increase in tensile strength in at least one direction or an increase in puncture strength of greater than about 2%.

\* \* \* \* \*